United States Patent
Kong (10) Patent No.: US 9,010,879 B2
(45) Date of Patent: Apr. 21, 2015

(54) PRE-FILL SYSTEM TO IMPROVE BRAKE FEEL AND METHOD OF INCREASING INITIAL FLUX USING THE SAME

(71) Applicant: Mando Corporation, Pyeongtaek-si, Gyeongi-do (KR)

(72) Inventor: Young Hun Kong, Gyeonggi-do (KR)

(73) Assignee: Mando Corporation, Pyeongtaek-si, Gyeonggi-do (KR)

(*) Notice: Subject to any disclaimer, the term of this patent is extended or adjusted under 35 U.S.C. 154(b) by 82 days.

(21) Appl. No.: 13/749,921

(22) Filed: Jan. 25, 2013

(65) Prior Publication Data
US 2013/0187442 A1 Jul. 25, 2013

(30) Foreign Application Priority Data

Jan. 25, 2012 (KR) .................. 10-2012-0007213

(51) Int. Cl.
- *B60T 15/38* (2006.01)
- *B60T 11/16* (2006.01)
- *B60T 7/06* (2006.01)
- *B60T 11/10* (2006.01)

(52) U.S. Cl.
CPC ................. *B60T 11/165* (2013.01); *B60T 7/06* (2013.01); *B60T 11/10* (2013.01); *B60T 15/38* (2013.01)

(58) Field of Classification Search
CPC ....... F16D 65/74; B60T 15/38; B60T 11/103; B60T 11/165
USPC ..... 188/196 A, 196 R, 351; 303/9.75, 59, 62, 303/84.1, 84.2; 60/579, 564
See application file for complete search history.

(56) References Cited

U.S. PATENT DOCUMENTS

| | | | | |
|---|---|---|---|---|
| 2,926,498 A * | 3/1960 | Oswalt | .......................... | 188/351 |
| 2,954,673 A * | 10/1960 | Oswalt | .......................... | 188/351 |
| 2,974,493 A * | 3/1961 | Hawley | ........................ | 303/9.75 |
| 5,911,484 A * | 6/1999 | Hashida | ..................... | 303/115.4 |

FOREIGN PATENT DOCUMENTS

JP 2009-208518 9/2009

OTHER PUBLICATIONS

Office Action for CN application No. CN 201310029948.5 mailed on Aug. 29, 2014.

* cited by examiner

*Primary Examiner* — Thomas J Williams
(74) *Attorney, Agent, or Firm* — Lowe Hauptman & Ham, LLP (57) ABSTRACT

Disclosed herein are a pre-fill system to improve brake feel and a method of increasing an initial flux using the same which may reduce an invalid travel distance of a brake pedal. The pre-fill system includes a first housing connected with the master cylinder and provided with a first bore having a smaller-diameter portion and a larger-diameter portion, a second housing provided with a stepped second bore communicating with the first bore to be coupled with the first housing to define a hydraulic pressure chamber, a piston arranged in the first bore and provided with an oil channel unit, and a valve assembly adapted to open and close the oil channel unit of the piston according to the hydraulic brake pressure, wherein the piston applies pressure to the hydraulic pressure chamber through the piston to supply hydraulic pressure to the disc brake.

9 Claims, 5 Drawing Sheets

FIG. 1

*PRIOR ART*

PRE-FILL SYSTEM TO IMPROVE BRAKE FEEL AND METHOD OF INCREASING INITIAL FLUX USING THE SAME

CROSS-REFERENCE TO RELATED APPLICATION(S)

This application claims the benefit of Korean Patent Application No. 2012-0007213, filed on Jan. 25, 2012 in the Korean Intellectual Property Office, the disclosure of which is incorporated herein by reference.

BACKGROUND

1. Field

Embodiments of the present invention relate to a pre-fill system to improve brake feel and a method of increasing an initial flux using the same which may reduce an invalid travel distance of a brake pedal.

2. Description of the Related Art

In general, a hydraulic brake system of a vehicle generates hydraulic brake pressure by pressing the oil supplied to a master cylinder from a reservoir and transfers the generated brake pressure to each wheel through a hydraulic pressure line of a brake. Braking operation is performed as the hydraulic brake pressure transferred to each wheel is again delivered to the corresponding disc brake, which generates a brake torque by applying pressure to both sides of a disc that rotates together with the wheel.

Figure 1:
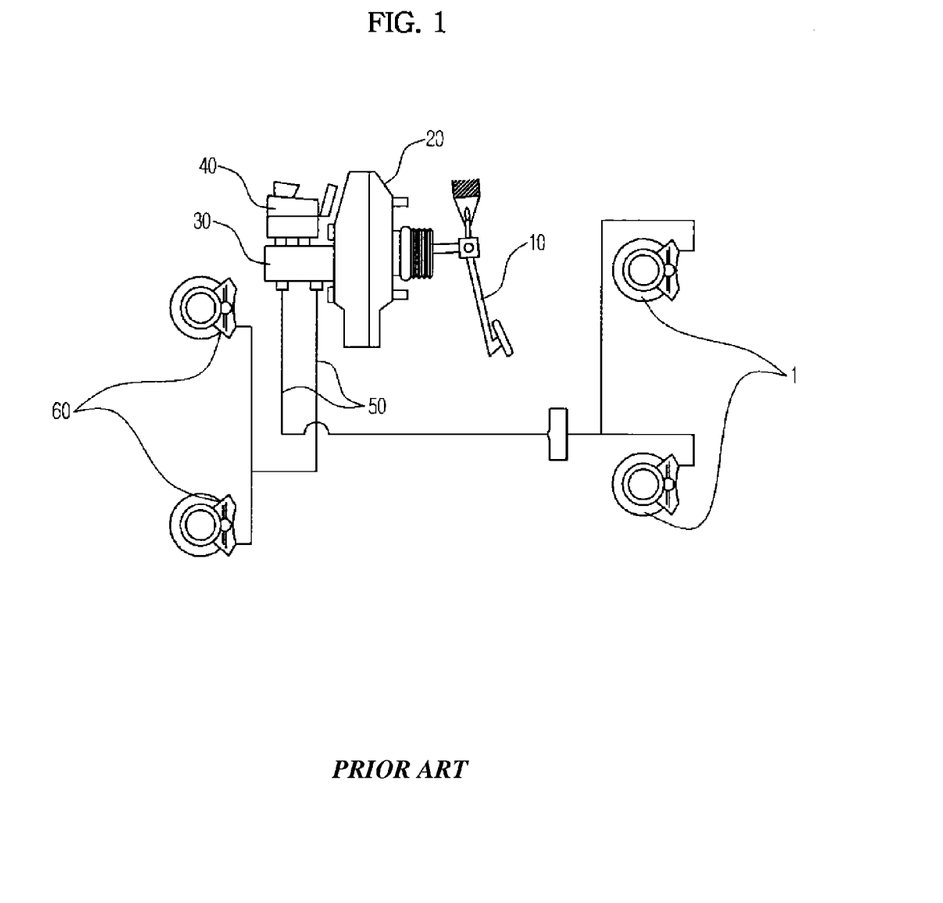
FIG. 1 is a view schematically illustrating a conventional hydraulic brake apparatus.

FIG. 1 is a view schematically illustrating a conventional hydraulic brake apparatus. With reference to FIG. 1, the hydraulic brake apparatus includes a booster 20 to amplify effort force on a brake pedal 10, a master cylinder 30 to convert force generated by the booster 20 into a hydraulic pressure, and a reservoir 40 coupled to an upper portion of the master cylinder 30 to supply oil to the master cylinder 30. The hydraulic brake apparatus generates braking force by transferring hydraulic brake pressure to a disc brake 60 installed at each wheel 1 through a hydraulic line 50 according to a driver's effort force.

However, when such hydraulic brake apparatus is used to perform braking, braking is not effected at the moment force is applied to the brake pedal 10, but is initiated after the brake pedal 10 travels a certain distance forward. The distance that the brake pedal 10 travels from the moment the brake pedal 10 begins to be depressed to when braking is initiated is referred to as a lost travel section (hereinafter, LT section). Brake feel improves with decreasing length of the LT section. If the LT section is extended, it may cause the driver to feel that the brake does not work and be dissatisfied with braking when he applies pressure to the brake pedal 10, and it may even an accident.

The length of this LT section is affected by the distance from the brake pedal 10 to the master cylinder 30 and the booster 20, the time at which pressure begins to rise in the master cylinder 30, the distance between the pads of the disc brake 60 and the disc, and the like. When the vehicle travels on an unpaved road such as an uneven road, the distance between the pads of the disc brake 60 and the disc increases, extending the LT section and resulting in degradation of pedal feel.

SUMMARY

Therefore, it is an aspect of the present invention to provide a pre-fill system to improve brake feel and a method of increasing an initial flux using the same which may reduce an invalid travel distance of a brake pedal in the initial lost travel (LT) section that the pedal travels until braking is initiated.

Additional aspects of the invention will be set forth in part in the description which follows and, in part, will be obvious from the description, or may be learned by practice of the invention.

In accordance with one aspect of the present invention, a pre-fill system installed between a master cylinder and a disc brake to increase an initial flux in braking includes a first housing connected with the master cylinder to receive hydraulic brake pressure and provided with a first bore having a smaller-diameter portion and a larger-diameter portion extending from the smaller-diameter portion, a second housing provided with a stepped second bore communicating with the first bore to be coupled with the first housing to define a hydraulic pressure chamber, the second housing being connected with the disc brake, a piston arranged in the first bore to be movable forward and backward and provided with an oil channel unit which has two different cross-sectional areas corresponding to the smaller-diameter portion and the larger-diameter portion and is penetrated in a longitudinal direction, and a valve assembly adapted to open and close the oil channel unit of the piston according to the hydraulic brake pressure, wherein, when braking is performed, the piston applies pressure to the hydraulic pressure chamber through a portion of the piston having the cross-sectional area corresponding to the larger-diameter portion among the two different cross-sectional areas to supply hydraulic pressure to the disc brake.

The oil channel unit may include a high-pressure hydraulic channel formed at a center of the piston, and a return channel spaced apart from the hydraulic pressure oil channel, the return channel communicating with the hydraulic pressure chamber.

The valve assembly may include a first valve arranged at one end of the piston positioned at the smaller-diameter portion and provided with an opening and closing hole in communication with the high-pressure hydraulic channel, a hydraulic spring to elastically support the first valve and the piston, a second valve arranged at the other end of the piston positioned at the larger-diameter portion to open and close the high-pressure hydraulic channel, and a pressure spring to press the second valve against the piston.

The hydraulic pressure chamber may be provided with a return spring to return the piston to an original position thereof according to hydraulic brake pressure.

The piston may be provided with a stopper to support the return spring and protrude in a direction of forward movement of the piston to limit a travel distance of the piston, and the stepped second bore may include a first step portion adapted to closely contact the first housing, a second step portion formed to have a smaller diameter than the first step portion and support the return spring, a third step portion formed to have a smaller diameter than the second step portion and face the stopper, and a fourth step portion formed to have a smaller diameter than the third step portion and support the pressure spring.

The third step portion may be provided with a sealing member to closely contact the stopper when the piston moves forward to limit the travel distance of the piston and prevent the piston from being moved back according to a reaction force.

The first housing may be provided with a vent hole allowing the first bore to communicate with open air through the larger-diameter portion.

The piston may be provided with a projection to open and close the vent hole according to forward and backward movement of the piston.

The first housing may be provided with a first port connected with the master cylinder, and a first communicating hole allowing the first port to communicate with the first bore, and the second housing may be provided with a second port connected with the disc brake, and a second communicating hole allowing the second port to communicate with the second bore.

In accordance with another aspect of the present invention, a method of increasing an initial flux by using the aforementioned pre-fill system which connects a master cylinder and a disc brake includes moving forward, by the hydraulic brake pressure supplied from the master cylinder, the piston having the different cross-sectional areas, and applying pressure to the hydraulic pressure chamber formed through the first bore adapted to have the diameter thereof extended as the piston moves forward and the second bore communicating with the first bore to transmit the hydraulic brake pressure to the disc brake.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The preferred embodiments described in the specification and shown in the drawings are only illustrative and are not intended to represent all aspects of the invention, such that various equivalents and modifications may be made without departing from the spirit of the invention.

Figure 2:
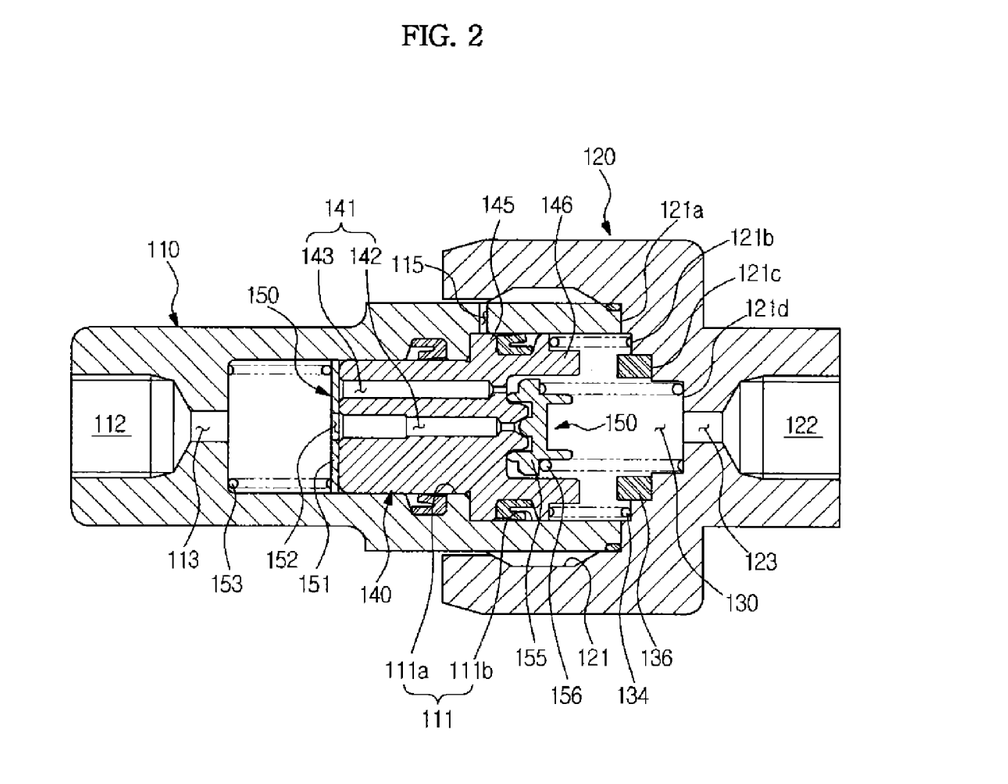
FIG. 2 is a view illustrating a pre-fill system according to an exemplary embodiment of the present invention.

FIG. 2 illustrates a pre-fill system according to an exemplary embodiment of the present invention With reference to FIG. 2, the pre-fill system includes a first housing 110 provided with a first bore 111 penetrated in a longitudinal direction, a second housing 120 coupled with the first housing 110 and provided with a second bore 121 communicating with the first bore 111, a piston 140 arranged in the first bore 111 to be movable forward and backward, and a valve assembly 150 to open and close the oil channel unit 141 of the piston 140 according to hydraulic brake pressure. The pre-fill system is installed between a master cylinder (not shown) and a disc brake (not shown), serving to increase an initial flux in braking to reduce the length of the lost travel (LT) section.

The first housing 110 is provided with the first bore 111 to be connected with the master cylinder to receive hydraulic brake pressure from the master cylinder. The first housing 110 is provided, at one end thereof, with a first port 112 connected with the master cylinder to receive the hydraulic brake pressure from the master cylinder, and the first port 112 is allowed to communicate with the first bore 111 by a first communicating hole 113.

The first bore 111 has a smaller-diameter portion 111a and a larger-diameter portion 111b. The smaller-diameter portion 111a is arranged to be connected with the first communicating hole 113, and the larger-diameter portion 111b having a larger diameter than the smaller-diameter portion 111a is arranged at the other end of the first housing 110. A piston 140 having a shape corresponding to that of the first bore 111 is arranged in the first bore 111 to be movable forward and backward.

In addition, a vent hole 115 is formed in the first housing 110 to ensure that a vacuum is not created during movement of the piston 140. The vent hole 115 is formed at a portion of the first housing 110 at which the larger-diameter portion 111b is located, allowing the first bore 111 to communicate with open air according to movement of the piston 140.

The second housing 120 is provided with the second bore 121 communicating with the first bore 111 at one end of the second housing 120 and connected with the disc brake. Arranged at the other end of the second housing 120 is a second port 122 connected with the disc brake to transmit the hydraulic brake pressure supplied from the master cylinder to the disc brake. The second port 122 is allowed to communicate with the second bore 121 by a second communicating hole 123. As the second housing 120 is coupled with the first housing 110, the first bore 111 and the second bore 121 are sealed to form a hydraulic pressure chamber 130.

The second bore 121 has a stepped configuration. That is, the second bore 121 includes a plurality of step portions 121a, 121b, 121c and 121d. As shown in FIG. 2, the second bore 121 includes first to fourth step portions 121a to 121d having a decreasing diameter from one end of the second bore 121 coupled with the first housing 110 to the other end of the second bore 121 connected with the disc brake. The first to fourth step portions 121a to 121d will be described later in the present application.

When the first housing 110 is coupled with the second housing 120, the second housing 120 surrounds the other end of the first housing 110, while the vent hole 115 is not sealed by the second housing 120 to allow the first bore 111 to communicate with the open air, as described above.

The piston 140 is arranged in the first bore 111 to be movable forward and backward, and serves to pressurize the hydraulic pressure chamber 130 formed by coupling of the first bore 111 and the second bore 121. Here, the piston 140 has a shape corresponding to that of the first bore 111, as described above. That is, the piston 140, which has two different cross-sectional areas, is adapted to pressurize the hydraulic pressure chamber 130 through a portion of the piston 140 having one of the two cross-sectional areas corresponding to that of the larger-diameter portion 111b to supply hydraulic brake pressure to the disc brake. Therefore, as the hydraulic brake pressure is allowed to be transferred through the expanded hydraulic pressure chamber 130 during initial braking, the flux may be increased to reduce the length of the LT section of the brake pedal. Such a piston 140 is provided with the oil channel unit 141 penetrated in a longitudinal direction.

The oil channel unit 141 includes a high-pressure hydraulic channel 142 formed at the center of the piston 140, and a return channel 143 spaced apart from the hydraulic channel 142 and communicating with the hydraulic pressure chamber 130. According to the hydraulic pressure supplied from the master cylinder, the high-pressure hydraulic channel 142 is maintained in a closed state by the valve assembly 150, which will be described below, when the hydraulic brake pressure is low, and opened to transfer the hydraulic brake pressure to the disc brake when the hydraulic brake pressure is high. The return channel 143 is maintained in a closed state by the valve assembly 150 when braking is performed so as to allow the piston 140 to move in the range of low brake pressure, and opened when the braking is released so as to transfer the hydraulic brake pressure to the master cylinder. The high-pressure hydraulic channel 142 and the return channel 143 will be described later in the present application.

Meanwhile, the piston 140 is provided with a projection 145 to open and close the vent hole 115. The projection 145 is adapted to selectively open and close the vent hole 115, which is positioned at the larger-diameter portion 111b of the first bore 111, as shown in FIG. 2. Also, the piston 140 is provided with a stopper 146 having a smaller diameter than the piston 140 and protruding in a direction of forward movement of the piston 140 to stably support the return spring 134 arranged in the hydraulic pressure chamber 130. The stopper 146 serves to limit the travel distance of the piston 140.

The return spring 134 is a coil spring serving to return the piston 140 to an original position thereof.

According to the illustrated embodiment, the valve assembly 150 is adapted to open and close the oil channel unit 141 of the piston 140 depending on the hydraulic brake pressure. The valve assembly 150 includes a first valve 151 arranged at one end of the piston 140 positioned in the smaller-diameter portion 111a, a hydraulic spring 153 to elastically support the first valve 151, a second valve 155 arranged at the other end of the piston 140 positioned in the larger-diameter portion larger-diameter portion 111b, and a pressure spring 156 to elastically support the second valve 155.

The first valve 151 is forced to closely contact the one end of the piston 140 by the hydraulic spring 153. Here, the first valve 151 is provided with an opening and closing hole 152 communicating with the high-pressure hydraulic channel 142. That is, the first valve 151 closes the return channel 143 of the oil channel unit 141 and communicates with one side of the high-pressure return channel 143 in normal times.

The second valve 155 is forced to closely contact the other end of the piston 140 by the pressure spring 156. In normal times, the second valve 155 closes the high-pressure hydraulic channel 142 and allows the return channel 143 to communicate with the hydraulic pressure chamber 130.

The valve assembly 150 is provided with two valves 151 and 155 which are opened and closed by a pressure difference that is caused during braking, and the adjustment of the pressure difference is determined by the hydraulic spring 153 and the pressure spring 156.

The step portions 121a, 121b, 121c and 121d of the second bore 121 are intended to stably install the piston 140 and the valve assembly 150 within the first bore 111 and the hydraulic pressure chamber 130 when the first housing 110 is coupled with the second housing 120. The first step portion 121a closely contacts the other end of the first housing 110, the second step portion 121b supports the return spring 134 which returns the piston 140 to an original position thereof, the third step portion 121c faces the stopper 146 of the piston 140, and the fourth step portion 121d supports the pressure spring 156 which presses the second valve 155 against the piston 140. Here, the third step portion 121c is provided with a sealing member 136 which limits the travel distance of the piston 140 by closely contacting the stopper 146 when the piston 140 moves forward. In addition to limiting the travel distance of the piston 140 in cooperation with the stopper 146, the sealing member 136 serves to prevent the piston 140 from being moved back by reaction force of the springs 136 and 156 which occurs when the piston 140 travels a certain distance to pressurize the hydraulic pressure chamber 130.

In a pre-fill system having the structure as above, when the hydraulic brake pressure is supplied during initial braking, the area (space) of the output portion O for discharge of hydraulic oil to the disc brake is larger than that of the input portion I. The input portion I indicates an area corresponding to the distance one portion of the piston 140 positioned at the smaller-diameter portion 111a of the first bore 111 travels during braking, and the output portion O indicates an area through which the hydraulic pressure chamber 130 is pressed according to the travel distance of another portion of the piston 140 positioned at the larger-diameter portion 111b (see FIG. 3). That is, by increasing the hydraulic brake pressure discharged to the disc brake during the initial braking to reduce the length of the LT section, brake feel may be improved and the braking distance may be prevented from being elongated.

Hereinafter, operation of generating braking force using the aforementioned pre-fill system will be described.

With reference to FIG. 2, the illustrated pre-fill system is in a state in which braking is not performed. That is, the piston 140 remains pressed leftward by the elasticity of the return spring 134 and the pressure spring 156. In this state, oil is contained in the hydraulic pressure chamber 130.

If braking is initiated in this state and the hydraulic brake pressure supplied by the master cylinder (not shown) is supplied to the first bore 111 through the first port 112 and the first communicating hole 113, the piston 140 will move together with the first valve 151 to apply pressure to the hydraulic pressure chamber 130. The operation of the pre-fill system according to braking is performed in two different operational regions, which are divided into a low-pressure region and a high-pressure region. For example, the low-pressure region may represent an operational region in which the hydraulic brake pressure is not greater than 2 bar, while the high-pressure region may represent the other operational region in which the hydraulic brake pressure is greater than 2 bar. The pressure ranges defined above for the low-pressure and high-pressure regions are arbitrarily set, and it is obvious that the pressure ranges for the low-pressure and the high-pressure regions may be selectively defined by expanding or narrowing the regions.

Figure 3:
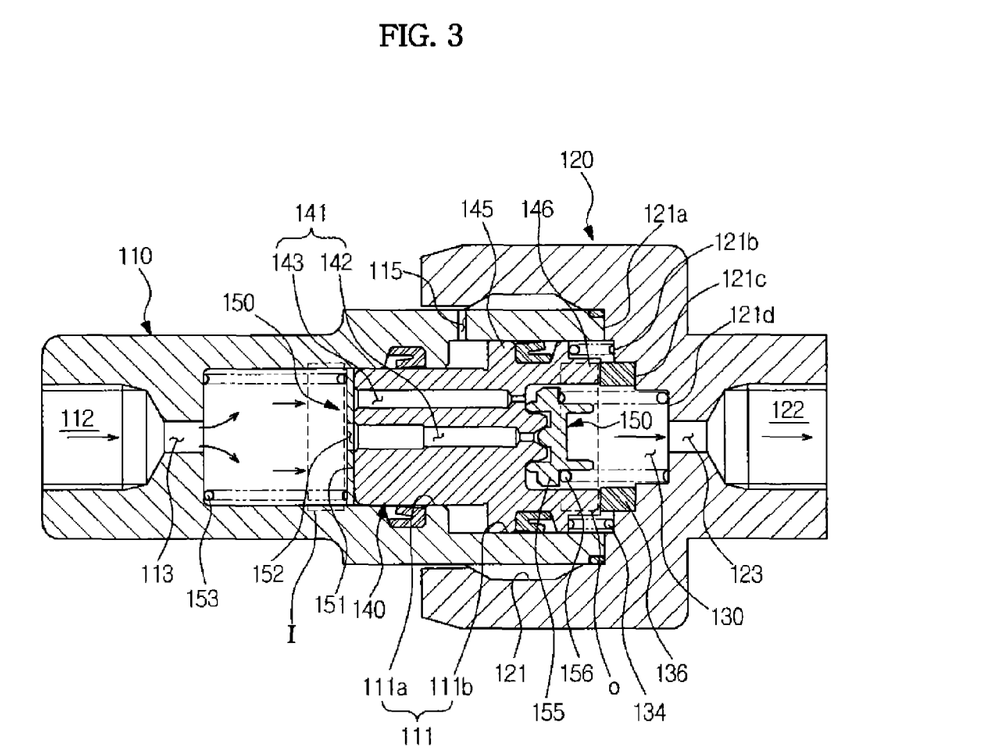
FIGS. 3 to 5 are views illustrating operations of the pre-fill system of FIG. 2.

Thereby, in the low-pressure region as shown in FIG. 3, when the hydraulic brake pressure is supplied to the first bore 111, the first valve 151 and the piston 140 are moved together to pressurize the hydraulic pressure chamber 130. Since the oil channel unit 141 formed in the piston 140 is maintained in a closed state by the first and second valves 151 and 155, the hydraulic brake pressure is not directly discharged to the disc brake (not shown), but the piston 140 itself is moved to pressurize the hydraulic pressure chamber 130. Then, the oil (i.e., the hydraulic brake pressure) formed in the hydraulic pressure chamber 130 is transferred to the disc brake to perform braking. That is, the invalid travel distance of the brake pedal may be reduced during the initial braking by increasing the discharge rate corresponding to the ratio of the output portion O to the input portion I of the piston 140 moved by the hydraulic brake pressure.

Further, after the hydraulic brake pressure is supplied to the disc brake with an increased flux, the stopper 146 of the piston 140 closely contacts the sealing member 136 arranged at the third step portion 121c. Thereby, sealing is formed and the travel distance of the piston 140 is limited, and thus the piston 140 may be prevented from being moved back according to the reaction force from the springs 134 and 156.

Meanwhile, when the piston 140 is moved, the projection 145 of the piston 140 is also moved to open the vent hole 115 to prevent vacuum from being created and thereby facilitate movement of the piston 140.

Figure 4:
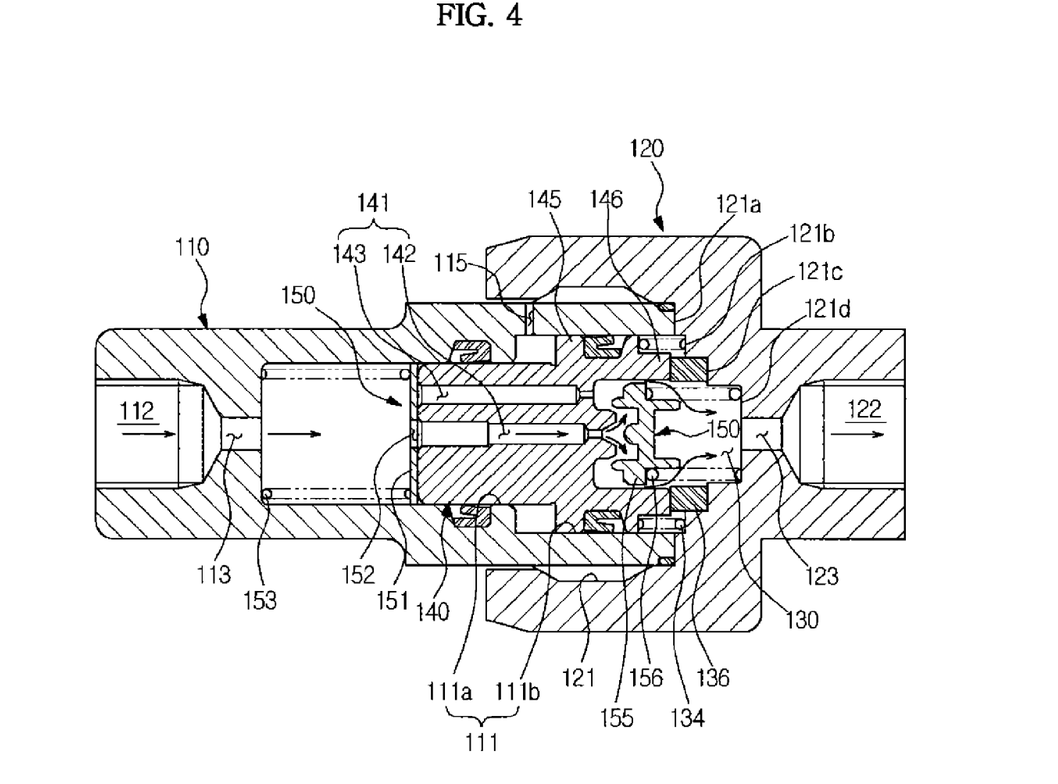
Figure 5:
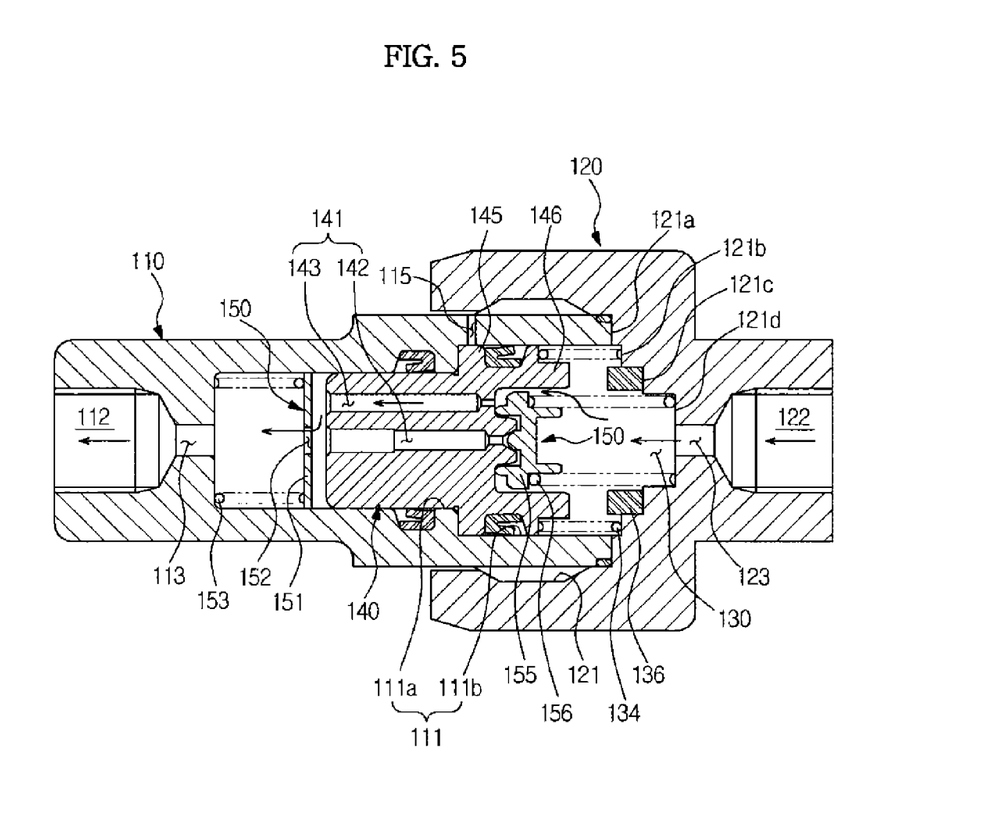

Next, in the high-pressure region, the hydraulic brake pressure supplied from the master cylinder is allowed to be transferred to the disc brake. That is, as shown in FIG. 4, the high hydraulic pressure pushes the second valve 155 through the high-pressure hydraulic channel 142 to open the high-pressure hydraulic channel 142, and is thus delivered to the disc brake through hydraulic pressure chamber 130.

Then, any further movement of the piston 140 is restricted by the stopper 146 and the sealing member 136.

When braking is completed, the hydraulic brake pressure transferred to the disc brake moves back to the master cylinder. As the hydraulic brake pressure moves back to the master cylinder, the second valve 155 is forced to close the high-pressure hydraulic channel 142 by the pressure spring 156 and the hydraulic brake pressure, and thereby the hydraulic brake pressure flows into the return channel 143. Accordingly, the hydraulic brake pressure delivered to the return channel 143 pushes the first valve 151 to open the return channel 143. After discharge from the return channel 143, the hydraulic brake pressure returns to the master cylinder through the opening and closing hole 152 of the first valve 151. As the pressure of the hydraulic brake pressure reduces gradually, the elastic force of the hydraulic spring 153 acts to cause the first valve 151 to closely contact the one end of the piston 140 again to close the return channel 143. That is, the pre-fill system is placed in the state shown in FIG. 1.

In conclusion, the pre-fill system according to the embodiments of the present invention may reduce the initial invalid travel distance of the brake pedal by increasing oil (or hydraulic brake pressure) discharged to the disc brake during initial braking, and thus brake feel may be improved and increase of the braking distance may be prevented.

As is apparent from the above description, a pre-fill system and a method of increasing an initial flux using the pre-fill system according to embodiments of the present invention may provide a large hydraulic brake pressure during initial braking before braking force is generated, thus reducing the invalid travel distance of a brake pedal by varying the discharge rate of oil using a piston for the pre-fill system installed between a master cylinder and a disc brake and formed to have two stages provided with different hydraulic areas. Thereby, brake feel may be improved and increase of the braking distance may be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pre-fill system installed between a master cylinder and a disc brake to increase an initial flux in braking, the pre-fill system comprising:
    a first housing connected with the master cylinder to receive hydraulic brake pressure and provided with a first bore having a smaller-diameter portion and a larger-diameter portion extending from the smaller-diameter portion;
    a second housing provided with a stepped second bore communicating with the first bore to be coupled with the first housing to define a hydraulic pressure chamber, the second housing being connected with the disc brake;
    a piston arranged in the first bore to be movable forward and backward and provided with an oil channel unit which has two different cross-sectional areas corresponding to the smaller-diameter portion and the larger-diameter portion and is penetrated in a longitudinal direction; and
    a valve assembly adapted to open and close the oil channel unit of the piston according to the hydraulic brake pressure,
    wherein, when braking is performed, the piston applies pressure to the hydraulic pressure chamber through a portion of the piston having the cross-sectional area corresponding to the larger-diameter portion among the two different cross-sectional areas to supply hydraulic pressure to the disc brake, wherein the oil channel unit includes a high-pressure hydraulic channel formed at a center of the piston, and a return channel spaced apart from the hydraulic channel, the return channel communicating with the hydraulic pressure chamber.

2. The pre-fill system according to claim 1, wherein the valve assembly comprises:
    a first valve arranged at one end of the piston positioned at the smaller-diameter portion and provided with an opening and closing hole in communication with the high-pressure hydraulic channel;
    a hydraulic spring to elastically support the first valve and the piston;
    a second valve arranged at the other end of the piston positioned at the larger-diameter portion to open and close the high-pressure hydraulic channel; and
    a pressure spring to press the second valve against the piston.

3. The pre-fill system according to claim 2, wherein the hydraulic pressure chamber is provided with a return spring to return the piston to an original position thereof according to hydraulic brake pressure.

4. The pre-fill system according to claim 3, wherein:
    the piston is provided with a stopper to support the return spring and protrude in a direction of forward movement of the piston to limit a travel distance of the piston; and
    the stepped second bore includes:
    a first step portion adapted to closely contact the first housing, a second step portion formed to have a smaller diameter than the first step portion and support the return spring, a third step portion formed to have a smaller diameter than the second step portion and face the stopper, and a fourth step portion formed to have a smaller diameter than the third step portion and support the pressure spring.

5. The pre-fill system according to claim 4, wherein the third step portion is provided with a sealing member to closely contact the stopper when the piston moves forward to limit the travel distance of the piston and prevent the piston from being moved back according to a reaction force.

6. The pre-fill system according to claim 1, wherein:
    the first housing is provided with a first port connected with the master cylinder, and a first communicating hole allowing the first port to communicate with the first bore; and
    the second housing is provided with a second port connected with the disc brake, and a second communicating hole allowing the second port to communicate with the second bore.

7. A pre-fill system installed between a master cylinder and a disc brake to increase an initial flux in braking, the pre-fill system comprising:

a first housing connected with the master cylinder to receive hydraulic brake pressure and provided with a first bore having a smaller-diameter portion and a larger-diameter portion extending from the smaller-diameter portion;

a second housing provided with a stepped second bore communicating with the first bore to be coupled with the first housing to define a hydraulic pressure chamber, the second housing being connected with the disc brake;

a piston arranged in the first bore to be movable forward and backward and provided with an oil channel unit which has two different cross-sectional areas corresponding to the smaller-diameter portion and the larger-diameter portion and is penetrated in a longitudinal direction; and a valve assembly adapted to open and close the oil channel unit of the piston according to the hydraulic brake pressure, wherein, when braking is performed, the piston applies pressure to the hydraulic pressure chamber through a portion of the piston having the cross-sectional area corresponding to the larger-diameter portion among the two different cross-sectional areas to supply hydraulic pressure to the disc brake, wherein the first housing is provided with a vent hole allowing the first bore to communicate with open air through the larger-diameter portion.

8. The pre-fill system according to claim 7, wherein the piston is provided with a projection to open and close the vent hole according to forward and backward movement of the piston.

9. A method of increasing an initial flux using the pre-fill system which connects a master cylinder and a disc brake according to any one of claims 1 and 2 to 8, the method comprising:

moving forward, by the hydraulic brake pressure supplied from the master cylinder, the piston having the different cross-sectional areas; and applying pressure to the hydraulic pressure chamber formed through the first bore adapted to have the diameter thereof extended as the piston moves forward and the second bore communicating with the first bore to transmit the hydraulic brake pressure to the disc brake.

* * * * *